United States Patent [19]
Ogikubo et al.

[11] Patent Number: 5,852,706
[45] Date of Patent: *Dec. 22, 1998

[54] APPARATUS FOR RECORDING AND REPRODUCING INTRA-FRAME AND INTER-FRAME ENCODED VIDEO DATA ARRANGED INTO RECORDING FRAMES

[75] Inventors: Junichi Ogikubo, Tokyo; Tadashi Katagiri, Kanagawa, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 660,610

[22] Filed: Jun. 6, 1996

[30] Foreign Application Priority Data

Jun. 8, 1995 [JP] Japan .................................. 7-142237
Jun. 8, 1995 [JP] Japan .................................. 7-142238

[51] Int. Cl.$^6$ ............................................ H04N 5/917
[52] U.S. Cl. ................................ 386/111; 386/124
[58] Field of Search ......................... 386/33, 40, 109, 386/111, 124; 360/8, 23, 48; 348/423, 384, 390, 410, 411, 409, 412

[56] References Cited

U.S. PATENT DOCUMENTS

| | | | |
|---|---|---|---|
| 5,047,852 | 9/1991 | Hanyu et al. | 386/112 |
| 5,309,292 | 5/1994 | Takakura | 360/48 |
| 5,329,275 | 7/1994 | Juri et al. | 386/124 |
| 5,341,250 | 8/1994 | Uchida et al. | 386/112 |
| 5,351,131 | 9/1994 | Nishino et al. | 360/33.1 |
| 5,440,345 | 8/1995 | Shimoda | 348/411 |
| 5,448,368 | 9/1995 | Rijckaert et al. | 386/112 |
| 5,532,837 | 7/1996 | Ootaka et al. | 386/112 |
| 5,574,566 | 11/1996 | Takakura et al. | 386/109 |
| 5,706,386 | 1/1998 | Miyazawa | 386/112 |

*Primary Examiner*—Thai Tran
*Assistant Examiner*—Aung S. Moe
*Attorney, Agent, or Firm*—Frommer Lawrence & Haug, LLP; William S. Frommer

[57] ABSTRACT

Apparatus for recording and reproducing video data to and from a recording medium in which frames of said video data are subjected to either intra-frame compression and encoding or inter-frame compression and encoding and arranged into recording frames each having a plurality of recording units of a predetermined capacity.

11 Claims, 9 Drawing Sheets

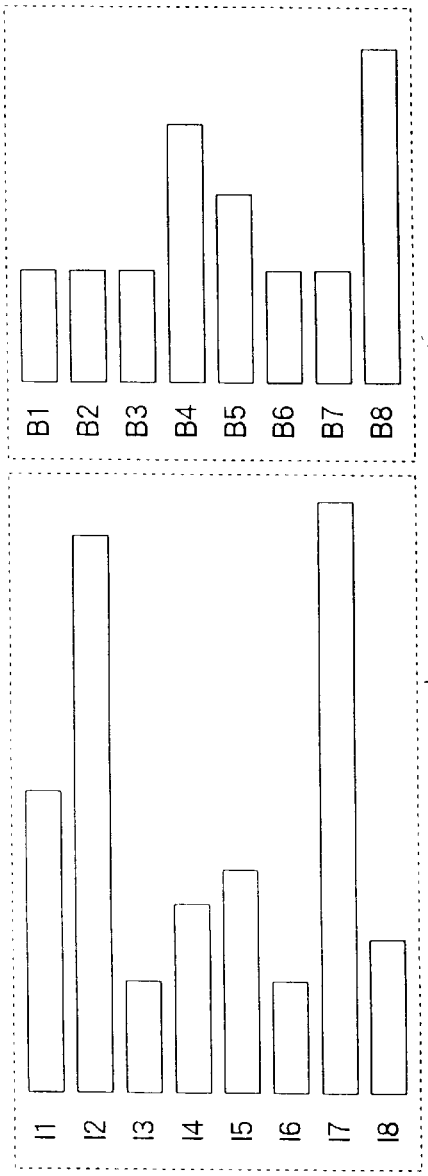

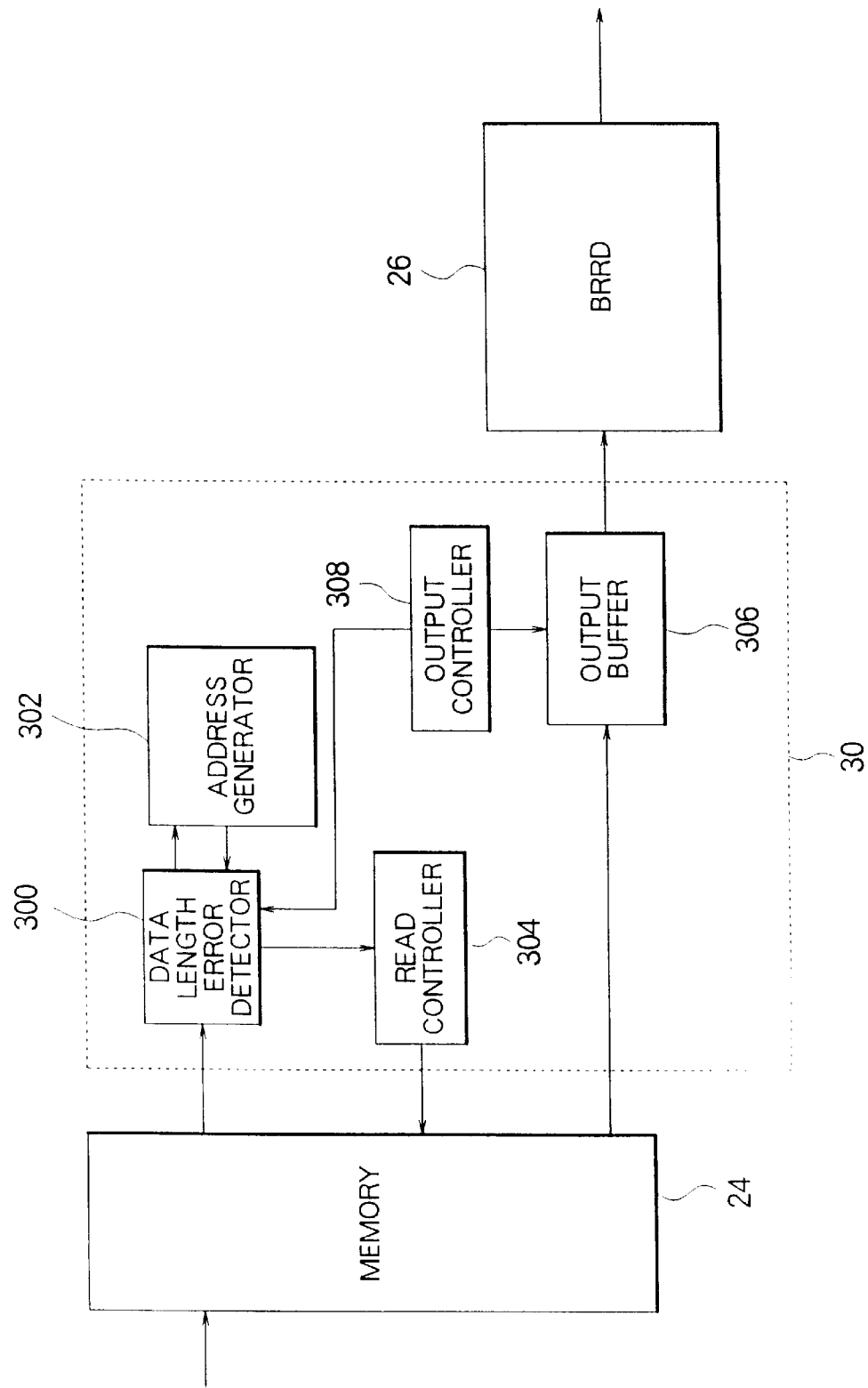

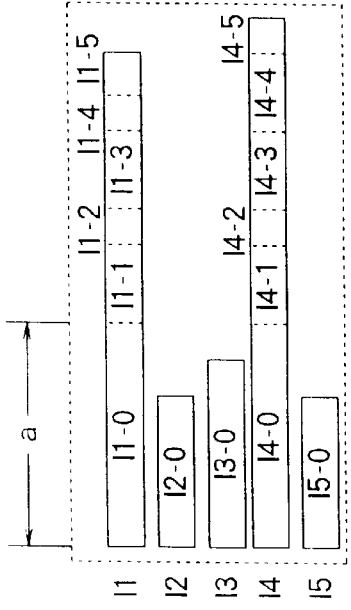
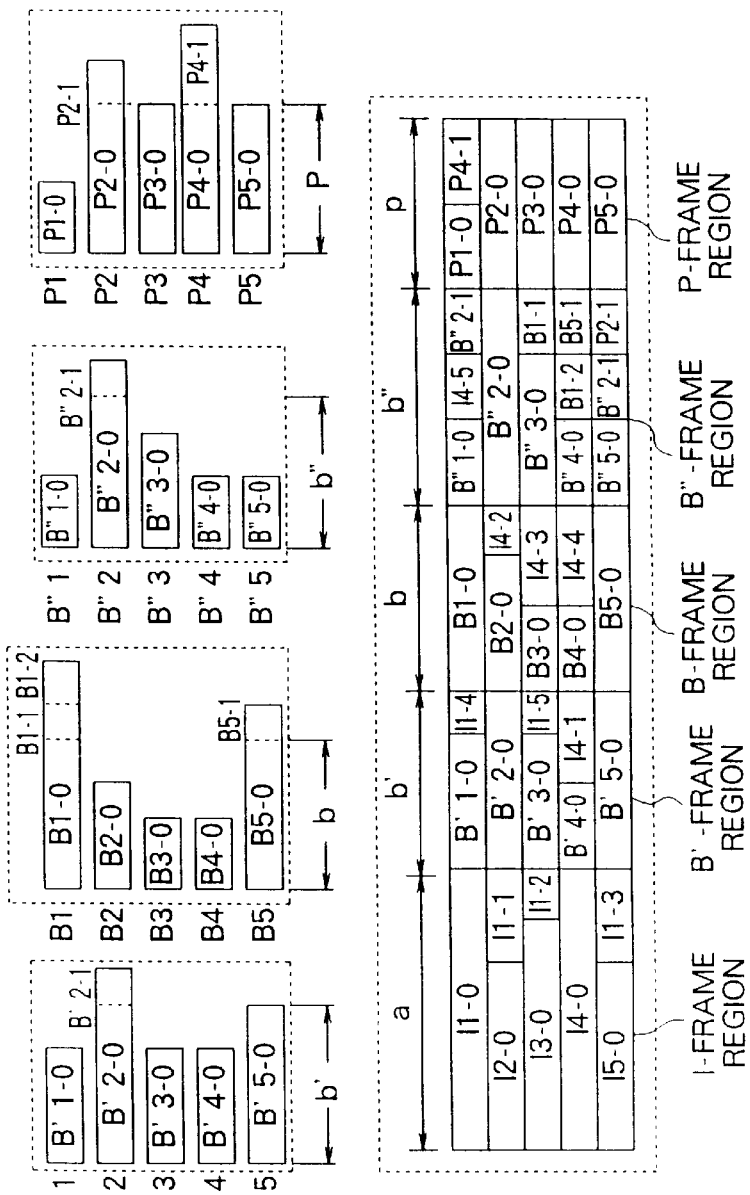
FIG. 9A
FIG. 9B
FIG. 9C

APPARATUS FOR RECORDING AND REPRODUCING INTRA-FRAME AND INTER-FRAME ENCODED VIDEO DATA ARRANGED INTO RECORDING FRAMES

BACKGROUND OF THE INVENTION

1. Field of the Invention

The present invention relates to a video data recording apparatus and a video data reproducing apparatus, for recording and reproducing compressed video data comprised of intra-frame data compressed and encoded independently from video data of other frames and inter-frame data compressed and encoded by utilizing a correlation with other frames and methods of the same.

2. Description of the Related Art

A moving picture experts group (MPEG) system or the like which compresses and encodes video data, for every predetermined number of frames, into intra-coded frame data (I-frame data) which enables decoding of one or more frames among the predetermined number of frames independently from other frames and into inter-frame data (predictive (P)-coded frame data and bidirectional predictive (B)-coded frame data, hereinafter simply referred to as "B-frame data" when referring to them overall) which decodes one or more of the others by using the data of the frame immediately before or before and after has been frequently used as a method of compressing video data.

More specifically, for example, a frame is divided into macro blocks each having a predetermined number of pixels (for example, 16×16). For every two frames, discrete cosine transformation (DCT) and variable length coding etc. are carried out on one of these frames in units of macro blocks independently from the other frame for compression and encoding, thereby generating I-frame data DC, AC1, . . . , DC', AC1', . . . corresponding to the macro blocks.

These intra-frame data DC, AC1, . . . , DC', AC1', . . . are arranged in a column in order from the DC component and the low frequency component and are recorded on a digital video tape etc. arranged in predetermined recording frames in this order. Note that, the B-frame data are recorded arranged behind the I-frame data.

Where the I-frame data etc. generated from a video frame are recorded simply arranged in one column, when a data error occurs in for example the I-frame data AC1, since the I-frame data has been subjected to variable length coding, the I-frame data AC2, . . . , DC', AC1', . . . , after the I-frame data AC1 can longer be reproduced at all.

On the other hand, where video data compressed and encoded by DCT etc. is reproduced, it is known that the lower the frequency of the component, the greater the influence exerted upon the quality of the reproduced video. That is, when reproducing compressed and encoded video data, even if some of the high frequency component is lost, a reproduced video without no substantial degradation can be obtained.

Further, while a video cannot be reproduced from the B-frame data without the I-frame data, a video can be reproduced from the I-frame data without the B-frame data.

SUMMARY OF THE INVENTION

The present invention was made paying attention to the above fact and has as an object thereof to provide a video data recording apparatus and a video data reproducing apparatus with which most of the low frequency component of the video data after the compression and encoding can be saved even if a data error occurs in the middle of the video data after the compression and encoding and methods for the same.

So as to achieve the object of the present invention, the present invention provides a video data recording apparatus which performs intra-frame compression and encoding on at least one frame in units of a predetermined number of frames of the video data, performs inter-frame compression and encoding on the other frames, and arranges the video data subjected to the intra-frame compression and encoding and the video data subjected to the inter-frame compression and encoding in predetermined recording frames including a plurality of recording units for recording the same on a recording medium, which apparatus has a first compressing and encoding means for dividing the at least one frame of video data into a plurality of blocks each containing a predetermined number of pixel data and performing compression and variable length coding in block units on the video data in the blocks independently from the adjoining frames of the video data so as generate for each of the plurality of blocks first compressed and encoded video data arranged in order from encoded data indicating a low frequency component to encoded data indicating a high frequency component; a second compressing and encoding means for dividing the other frames of the video data into a plurality of blocks each containing a predetermined number of pixel data and performing the compression and variable length coding in block units on the video data in the blocks utilizing the correlation with the adjoining frames of the video data so as to generate for each of the plurality of blocks second compressed and encoded video data arranged in order from the encoded data indicating the low frequency component to the encoded data indicating the high frequency component; a recording frame generating means for arranging each of the first compressed and encoded video data having a data length not more than the data length of the recording units among the plurality of first compressed and encoded video data generated for each of the plurality of blocks by the first compressing and encoding means from the head portions of the recording units, arranging, for each of the first compressed and encoded video data having a data length more than the data length of the recording units, the data of the portion corresponding to the data length of the recording units from the head portions of the first compressed and encoded video data from the head portions of the recording units, and arranging the data of the portion exceeding the data length of the recording units of the first compressed and encoded video data and the second compressed and encoded video data from the head portions of the empty regions of the recording units so as to generate the recording frames; and a recording means for recording the first compressed and encoded video data and the second compressed and encoded video data arranged in the recording frames on a recording medium.

Further, so as to achieve the object of the present invention, the present invention provides a video data reproducing apparatus for reproducing video data from a recording medium on which are recorded first compressed and encoded video data and second compressed and encoded video data of recording frames obtained by dividing, in units of a predetermined number of frames of video data, at least one frame of the video data into a plurality of blocks each containing a predetermined number of pixel data and performing compression and variable length coding in block units on the video data in the blocks independently from the adjoining frames of the video data so as generate for each of the plurality of blocks first compressed and encoded video data arranged in order from encoded data indicating a low frequency component to encoded data indicating a high frequency component; dividing the other frames of the video data into a plurality of blocks each containing a predetermined number of pixel data and performing the compression and variable length coding in block units on the video data in the blocks utilizing the correlation with the adjoining frames of the video data so as to generate for each of the plurality of blocks second compressed and encoded video data arranged in order from the encoded data indicating the low frequency component to the encoded data indicating the high frequency component; arranging each of the first compressed and encoded video data having a data length not more than the data length of the recording units among the plurality of first compressed and encoded video data generated for each of the plurality of blocks from the head portions of the recording units, arranging, for each of the first compressed and encoded video data having a data length more than the data length of the recording units, the data of the portion corresponding to the data length of the recording units from the head portions of the first compressed and encoded video data from the head portions of the recording units, and arranging the data of the portion exceeding the data length of the recording units of the first compressed and encoded video data and the second compressed and encoded video data from the head portions of the empty regions of the recording units, which apparatus has a reproducing means for reproducing the first compressed and encoded video data and the second compressed and encoded video data of the recording frames from the recording medium; a first extracting means for extracting the first compressed and encoded video data having a data length not more than the data length of the recording units and the data of the portion of the data length of the recording units from the head portions of the first compressed and encoded video data having a data length more than the data length of the recording units from the head portions of the recording units of the reproduced recording frames; a second extracting means for extracting the data of the portion exceeding the data length of the recording units of the first compressed and encoded video data and the second compressed and encoded video data from the head portions of the regions of other than the portions from which the data was extracted by the first extracting means among the regions of the reproduced recording frames; and an outputting means for outputting the first compressed and encoded video data and the second compressed and encoded video data extracted by the first extracting means and the second extracting means as the video data.

BRIEF DESCRIPTION OF THE DRAWINGS

These and other objects and features of the present invention will become more apparent from the following description of with reference to the accompanying drawings, in which:

FIGS. 5A to 5C are views explaining I-frame data and B-frame data arranged in recording frames by the packing circuit shown in FIG. 1 and FIG. 2;

FIG. 6 is a block diagram of an embodiment of a depacking circuit of the VTR apparatus shown in FIG. 1;

FIGS. 9A to 9C are views explaining the operation of the packing circuit shown in FIG. 1 and FIG. 2 in still another embodiment.

DESCRIPTION OF THE PREFERRED EMBODIMENTS

Below, a first embodiment of the present invention will be explained.

Figure 1:
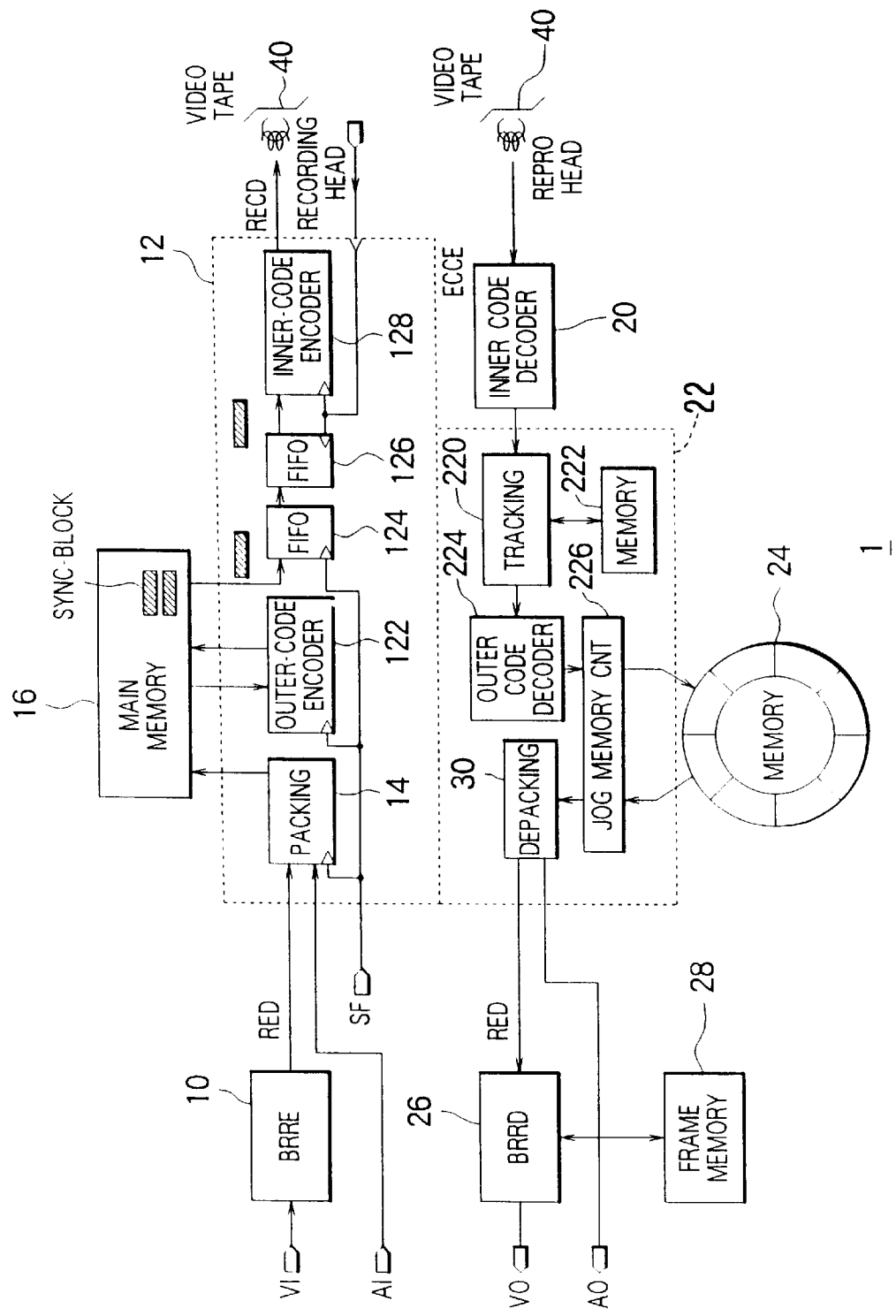
FIG. 1 is a block diagram of an embodiment of a VTR apparatus according to the present invention.

FIG. 1 is a block diagram of an embodiment of a digital video recorder (VTR apparatus) 1 which can perform recording and reproduction of an audio-video signal according to the present invention.

As shown in FIG. 1, the VTR apparatus 1 is constituted by a compressing and encoding device 10, an error correction code encoder (ECC encoder: ECCE) 12, a main memory 16, an inner code decoder 20, an ECC decoder 22, a memory 24 for jog shuttling, a decompression and decoding device 26, and a frame memory 28. Note that, in FIG. 1, the portion for processing the data for the audio is omitted for simplification of the illustration.

Further, the ECC encoder 12 is configured by a packing circuit 14, an outer code encoder 122, a first first-in first-out (FIFO) circuit 14, a second FIFO circuit 126, and an inner code encoder 128.

Further, the ECC decoder 22 is configured by a tracking circuit 220, a memory circuit 222, an outer code decoder 224, a jog memory control circuit 226, and a depacking circuit 30.

Due to the above constituent portions, the VTR apparatus 1 independently compresses and encodes for example one of two frames into intra-frame coded data (I-frame data) which enables reproduction of data of the original video (hereinafter referred to as the "video data") by the MPEG method or the like, compresses and codes the other to the bi-directional predictive encoded data (B-frame data which is one type of inter-frame data) which enables reproduction by using the two adjoining frames of video data after reproduction, records these data together with the data of the audio (hereinafter referred to as the "audio data") on a video tape 40, reads the recorded audio and video data from the video tape 40, and reproduces the same.

Figure 2:
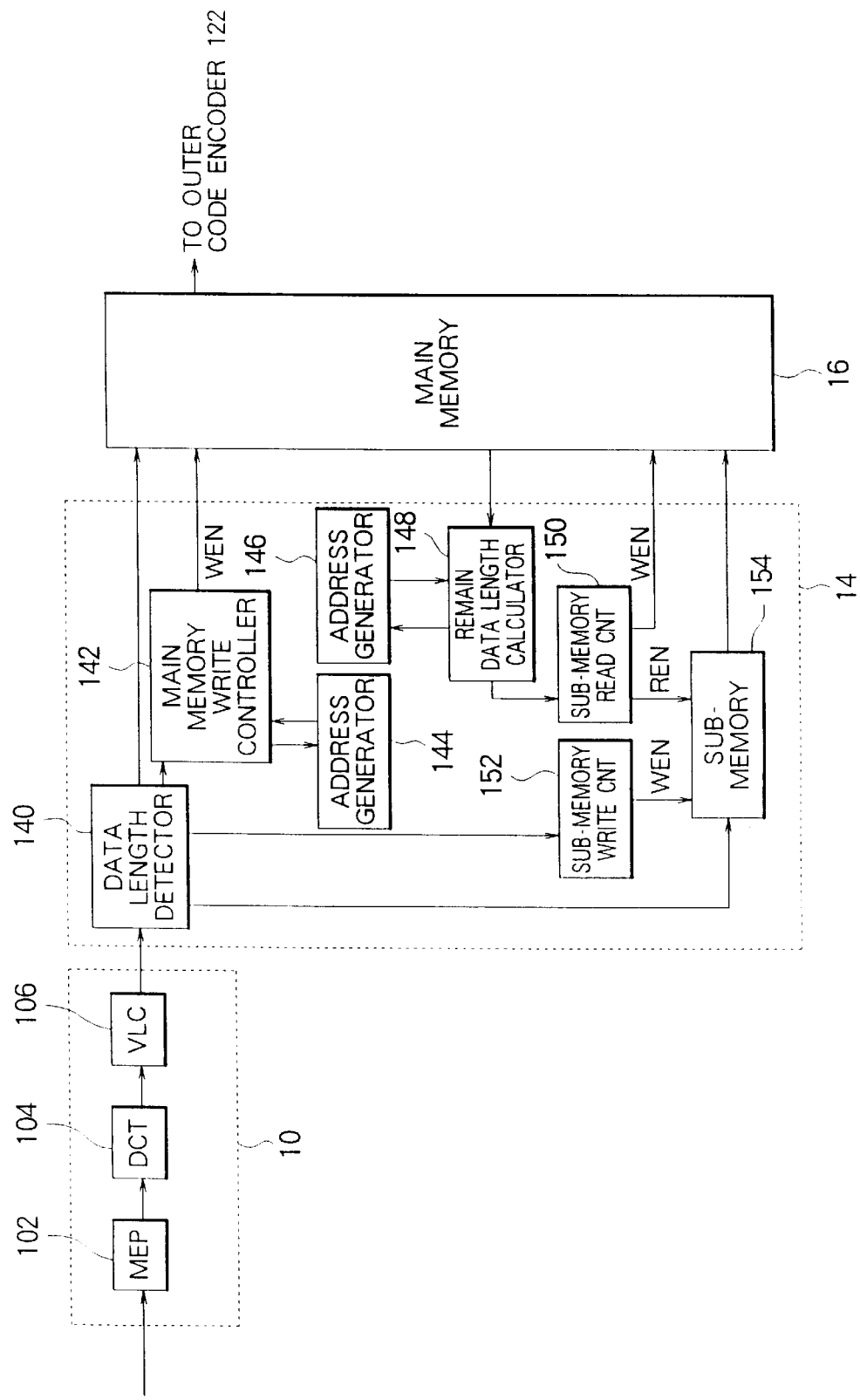
FIG. 2 is a block diagram of an embodiment of a compressing and encoding apparatus and a packing circuit of the VTR apparatus shown in FIG. 1.

FIG. 2 is a view of the configuration of the compressing and encoding device 10 and the packing circuit 14 shown in FIG. 1.

Figures 3A, 3B, 3C, 3D:
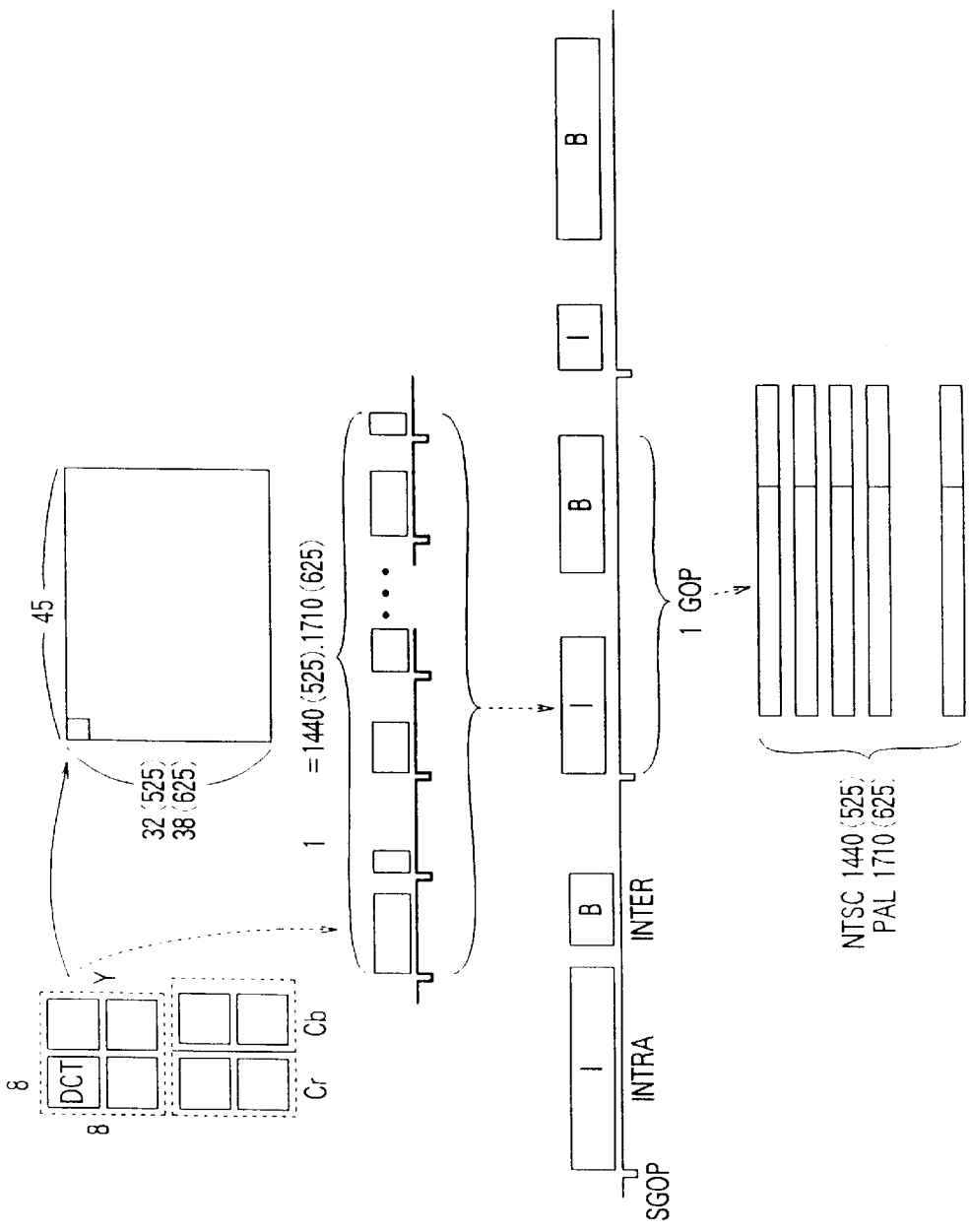
FIGS. 3A to 3D are views explaining the processing of the compressing and encoding apparatus shown in FIG. 2.

FIG. 3A to FIG. 3D are views explaining the processing of the compressing and encoding device 10, in which FIG. 3A shows the configuration of a macro block contained in a frame; FIG. 3B shows the I-frame data and B-frame data to be generated; FIG. 3C shows enlargements of the I-frame data and the B-frame data shown in FIG. 3B; and FIG. 3D shows a group of pictures GOP comprised by the I-frame data and the B-frame data shown in FIG. 3B and FIG. 3C.

Figures 4A, 4B:
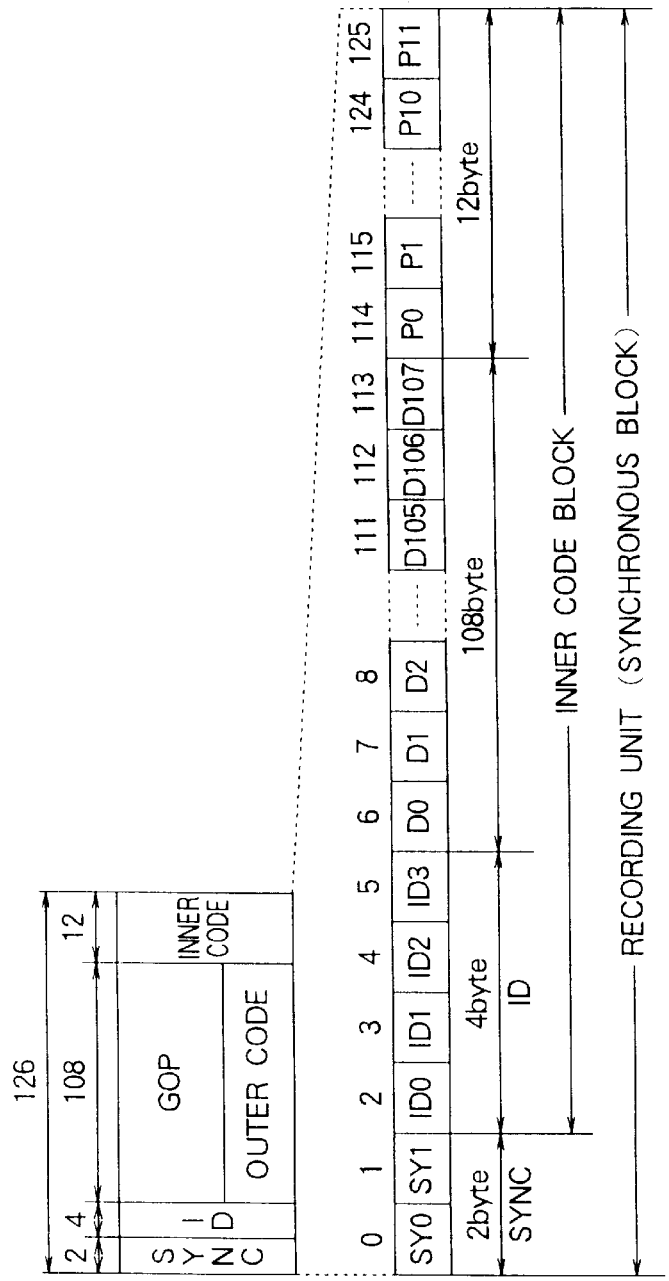
FIGS. 4A and 4B are views of the configuration of the recording frame.

FIG. 4A and FIG. 4B are views of the configuration of a recording frame, in which FIG. 4A shows the configuration of the recording frame and FIG. 4B is a view of the configuration of a recording unit (synchronization block) constituting part of the recording frame.

As shown in FIG. 2, the compressing and encoding device 10 is constituted by a motion compensation circuit (MEP) 102, a discrete cosine transformation circuit (DCT circuit) 104, and a variable length coding circuit (VLC) 106.

Due to these constituent portions, the compressing and encoding device 10 compresses and encodes one of two frames of the video data VI input from the outside as data corresponding to for example component signals (luminance data Y and color difference data $C_r$ and $C_b$) into I-frame data and compresses and encodes the other into B-frame data.

The motion compensation circuit 102 divides each of the two frames into 16×16 macro blocks respectively corresponding to the luminance data Y and the color difference data $C_r$ and $C_b$ as shown in FIG. 3A, performs motion compensation processing on the other of the two frames with the frames immediately before and immediately after it in time in units of macro blocks, and outputs the detected motion vectors to the DCT circuit 104.

The DCT circuit 104 transforms each of the macro blocks contained in one of the two frames of the video data in the time domain and the motion vectors detected for each of the macro blocks contained in the other frame, input from the motion compensation circuit 102, to the data of the frequency domain by discrete cosine transformation (DCT) and further quantizes the same by a predetermined quantization step (gradation), generates the I-frame data and B-frame data respectively corresponding to the macro blocks contained in the two frames, and outputs the same to the variable length coding circuit 106 in order from the DC component and the low frequency component.

Note that, in actuality, as shown in FIG. 3A, the DCT circuit 104 further divides the 16×16 pixel macro blocks corresponding to the luminance data Y into four blocks each comprised of 8×8 pixels, divides the 16×16 pixel macro blocks corresponding to the color difference data $C_r$ and $C_b$ into two blocks each comprised of 8×8 pixels, and performs the DCT processing in units of the blocks after the division.

Also, as shown in FIG. 3B and FIG. 3C, the DCT circuit 104 enlarges the quantization steps (gradations) with respect to the I-frame data when the motion of the video is large and the amount of the B-frame data becomes larger and conversely reduces the quantization steps (gradations) with respect to the I-frame data and increases the amount of the I-frame data when the motion of the video is small and thereby performs the quantization processing so that the amount of data of all groups of pictures GOP becomes the same. By performing such quantization processing, the DCT circuit 104 reduces the amount of data of each group of pictures GOP to not more than the amount of data which can be accommodated in a recording frame and equalizes the amount of data of the groups of pictures GOP.

The variable length coding circuit 106 performs variable length coding on the data input from the DCT circuit 104 and, as shown in FIG. 3B to FIG. 3D, outputs groups of pictures GOP each comprised by one I-frame data and one B-frame data from two frames worth of the video data, one frame being comprised of 1440 or 1710 macro blocks, to the packing circuit 14 as the compressed video data RED, one of which is contained for every cycle of the synchronization signal SGOP.

Note that the variable length coding circuit 106 adds an end identifier EOB indicating the end after the last of the macro block data.

Also, as shown in FIG. 2, the packing circuit 14 is configured by a data length detection circuit 140, a memory write control circuit 142, address generating circuits 144 and 146, a remaining data length calculating circuit 148, a sub-memory write control circuit 150, a sub-memory write control circuit 152, and a sub-memory 154.

Due to these constituent parts, the packing circuit 14 operates in synchronization with a synchronization signal SF synchronized with the video data VI and arranges the I-frame data and B-frame data input from the compressing and encoding device 10 and the audio data AI in 36 recording frames in the PAL system or 30 recording frames in the NTSC system as shown in FIG. 4A. Note, for clarification of the explanation, the following explanation will be made omitting the processing for the audio data AI.

Note that this recording frame is comprised by 1440 (or 1710) recording units (synchronization blocks) shown in FIG. 4B. In each of these synchronization blocks, synchronization codes SYNC are arranged in the two leading bytes; identification codes ID are arranged in the four subsequent bytes; groups of pictures GOP generated by the compressing and encoding device 10 or the outer codes generated by the outer code encoder 122 are arranged in the 108 subsequent bytes; and inner codes generated by the inner code encoder 128 are arranged in the 12 last bytes.

The synchronization blocks correspond to the macro blocks of the frames of the video data and to the groups of pictures GOP generated from these macro blocks. I-frame data (data from the head portion to the 108th byte when the data length of the I-frame data is 108 or more bytes) generated from the corresponding macro blocks are arranged from the head portion to 1440 (in the case of the NTSC system) or 1710 (in the case of PAL system). The portion of the I-frame data from the 109th byte and the B-frame data are arranged in the remaining portion.

Note that the arrangement of the I-frame data and the B-frame data in this recording frame will be described later referring to FIG. 5A to FIG. 5C.

FIG. 5A to FIG. 5C are views explaining the I-frame data and B-frame data arranged in the recording frame by the packing circuit 14 shown in FIG. 1 and FIG. 2. Note that, in FIG. 5A to FIG. 5C, for the simplification of illustration and explanation, a case is shown where there are eight synchronization blocks.

The arrangement of the groups of pictures GOP to the recording frames by the packing circuit 14 mentioned above corresponds to the stuffing of the I-frame data and B-frame data shown in FIG. 5A in the recording frame as shown in FIG. 5C.

That is, by the above operation, where the I-frame data (data from the head portion to the 108th byte when the data length of the I-frame data is 108 or more bytes) are arranged in the corresponding synchronization blocks, the overflow data (data from the 109th byte of I-frame data having a data length of 109 bytes or more) are arranged in order from the head portion of the empty region after arranging the I-frame data, and further the B-frame data are arranged in order from the head portion of the empty region after arranging these data.

Further, as shown in FIG. 5C, at the head portion of the synchronization block in which the I-frame data are arranged by the operation of the packing circuit 14, the data is arranged in order from the DC component (DC) and the low frequency component (AC1, AC2, . . . ) generated from each of the macro blocks (FIG. 3A). Accordingly, at the time of reproduction, even in a case where a data error occurs midway, the DC component and low frequency component of the I-frame data important for the reproduction of the video can be obtained by reading each of the synchronization blocks from their head portions.

The outer code encoder 122 (FIG. 1) operates in synchronization with the synchronization signal SF and adds the outer code for the error correction shown in FIG. 4A to the recording frame stored in the main memory 16.

The FIFO circuit 124 reads and buffers the recording frame stored in the main memory 16 in synchronization with the synchronization signal SF and outputs the same to the FIFO circuit 126.

The FIFO circuit 126 buffers the recording frame input from the FIFO circuit 124 and outputs the same to the inner code encoder 128 in synchronization with the synchronization signal RF used for the writing of the data to the video tape 40.

The inner code encoder 128 operates in synchronization with the synchronization signal RF, generates the inner code for the error correction shown in FIG. 3A, adds this to the recording frame to complete the recording frame, and records the same on the video tape 40 via the recording head.

The recording frame recorded on the video tape 40 is read out via the reproduction head and input to the inner code decoder 20.

The inner code decoder 20 performs error correction with respect to each of the synchronization blocks by using the inner code shown in FIG. 3A and outputs the resultant data to the ECC decoder 22.

The tracking circuit 220 performs control by using the memory circuit 222 so that the reproduction head correctly tracks the video tape 40.

The outer code decoder 224 performs error correction with respect to the I-frame data and B-frame data of the groups of pictures GOP arranged in the recording frame by using the outer code shown in FIG. 4A and outputs the resultant data to the jog memory control circuit 226.

The jog memory control circuit 226 stores the I-frame data and B-frame data input from the outer code decoder 224 in the memory 24, reads this in accordance with a command from the outside, performs the processing for special reproduction such as so-called "jog shuttling", and outputs the resultant data to the depacking circuit 30.

FIG. 6 is a view of the configuration of the depacking circuit 30 shown in FIG. 1. Note, in FIG. 6, for the simplification of illustration, the jog memory control circuit 226 between the depacking circuit 30 and the memory 24 is omitted.

As shown in FIG. 6, the depacking circuit 30 is constituted by a data length error detection circuit 300, an address generating circuit 302, a read control circuit 304, an output buffer circuit 306, and an output control circuit 308 and, as shown in FIG. 5B, reproduces the I-frame data and B-frame data arranged in the recording frame and outputs the same to the decompression and decoding device 26.

The decompression and decoding device 26 performs the processing corresponding to the compressing and encoding device 10, that is, variable length decoding processing corresponding to the variable length coding circuit 106, inverse discrete cosine transformation (IDCT) processing corresponding to the DCT circuit 104, and motion compensation processing with respect to the B-frame data corresponding to the motion compensation circuit 102 with respect to the I-frame data and B-frame data input from the depacking circuit 30 and generates and outputs the video data VO corresponding to the original video data VI and audio data AO.

Below, an explanation will be made of the operation of the VTR apparatus 1.

The video data VI input to the compressing and encoding device 10 is compressed and encoded by the compressing and encoding device 10 for every 2 frames into the I-frame data and B-frame data for every macro block and output to the ECC encoder 12.

The ECC encoder 12 arranges the I-frame data and B-frame data input from the compressing and encoding device 10 in the recording frame as shown in FIG. 5B, further adds the outer code and inner code to this to complete the recording frame shown in FIG. 4A, and records the same on the video tape 40.

The inner code decoder 20 performs error correction for the I-frame data and B-frame data contained in the recording frame recorded on the video tape 40 by using the inner code contained in the recording frame and outputs the same to the ECC decoder 22.

The ECC decoder 22 performs the error correction for the I-frame data and B-frame data by using the outer code.

Further, the depacking circuit 30 takes out as is the I-frame data having not more than a data length that can be arranged in the synchronization block (108 bytes), adds to the portions from the head portions to 108th byte of the I-frame data having 109 bytes or more the portions from the 109th byte of the I-frame data corresponding to the same to reproduce the original I-frame data, or takes out and separates the B-frame data, restores the arrangement to that of the macro blocks of the original groups of pictures GOP shown in FIG. 3B, and outputs the result to the decompression and decoding device 26.

As explained above, according to the VTR apparatus 1 according to the present invention, the DC component and low frequency component of the I-frame data important at the time of reproduction can be always read out from the head portions of the synchronization blocks constituting the recording frame.

Accordingly, even if a data error which cannot be corrected by the inner code decoder 20 and the outer code decoder 224 occurs in the I-frame data contained in the transmission frame, only the data from that portion to the end of the same synchronization block is lost. That is, even if a data error occurs, the low frequency portion of the I-frame data is not lost and the high frequency component (portion not contained in one synchronization block) of the macro blocks having a higher priority than the synchronization block after this and the B-frame data are not lost.

Also, for the reproduction of a video, the I-frame data, which is more important than the B-frame data, can be saved with a higher priority than the B-frame data, therefore even in a case where a data error occurs as mentioned above, the influence exerted upon the video after reproduction can be kept small.

Also, in the ECC decoder 22, when variable speed reproduction referred to as so-called "jog shuttling" is carried out using the jog memory control circuit 226 and the memory 24, only the front part of each of the synchronization blocks contained in the recording frame is reproduced from the video tape 40. In this case as well, the DC component and the low frequency component side of the I-frame are always reproduced and the high frequency component of the I-frame and the B-frame data having little effect even if they are missing at the time of video reproduction are lost. Therefore the quality of the reproduced video at the time of variable speed reproduction is improved.

Also, by reading the data from the head portion of each synchronization block up to the end identifier EOB or up to the end of each block at the time of variable speed reproduction, the DC component and low frequency component of the I-frame can be taken out, therefore variable speed reproduction processing becomes easy.

Further, irrespective of the fact that the above effect is exhibited, the amount of hardware which should be added so as to realize the present invention is small.

Note that, in addition to the use of the recording frame as shown in FIG. 5B, it is also possible for example to use a synchronization signal of a frequency of 1/N (N is an integer of 2 or more) of the synchronization signal in the case of use of the recording frame as shown in FIG. 5B as the clock at the time of writing the I-frame data and B-frame data in the recording frame and to divide the synchronization block of the recording frame into N portions. In this case, the I-frame data or the B-frame data can be taken out by performing the depacking from a predetermined position of the synchronization block.

Figure 7A:
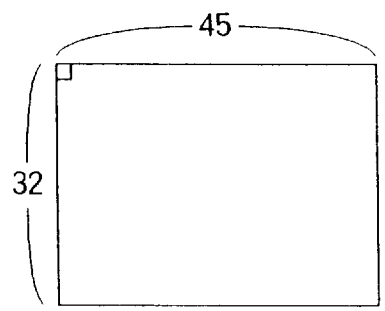
FIGS. 7A and 7B show an example of the cutting out of a macro block where one I-frame is brought into correspondence with one synchronization block.
Figure 7B:
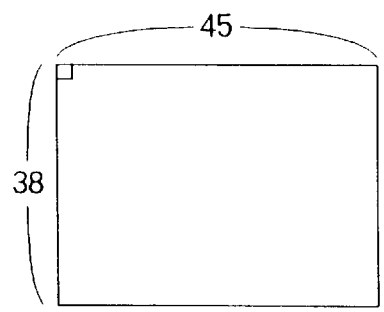

Note that FIGS. 7A and 7B show an example of cutting out a macro block in the case where one I-frame is made to correspond to one synchronization block.

As shown in FIGS. 7A and 7B, 45×32 (1440: in the case of the NTSC system) or 45×38 (1710: in the case of the PAL system) macro blocks of 16×16 pixels are cut out from the I-frame and given a one-to-one correspondence with the synchronization blocks shown in FIGS. 4A and 4B.

Since the relationship of 1440:1710≈10:12 is established, this proportion becomes the proportion of the amount of data on the video tape 40 as it is.

Accordingly, in the VTR apparatus 1, in the case of the NTSC system, 10 tracks are treated as a set to record one GOP's worth of the video data. In the case of the PAL system, 12 tracks are treated as a set to record one GOP's worth of the video data. Therefore, processing such as jog shuttle reproduction for the data of these two systems becomes possible by using the same apparatus without a change of the mechanical portions of the VTR apparatus 1 or the recording format of the video tape 40.

Next, another embodiment of the present invention will be explained.

This other embodiment can save not only the DC component and low frequency component of the I-frame data, but also the DC component and the low frequency component of the B-frame data even if a data error occurs in the recording frame when reproducing data from the video tape 40 by improving the operation of the packing circuit 14 and the depacking circuit 30 in the VTR apparatus 1 shown in FIG. 1.

FIG. 8A to FIG. 8E are views explaining the operation of the packing circuit 14 shown in FIG. 1 and FIG. 2 in the other embodiment.

Figure 8C:
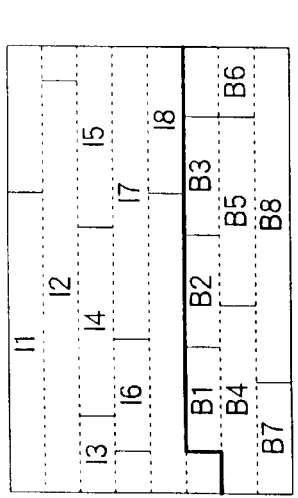
FIGS. 8A to 8E are views explaining the operation of the packing circuit shown in FIG. 1 and FIG. 2 in another embodiment.
Figure 8D:
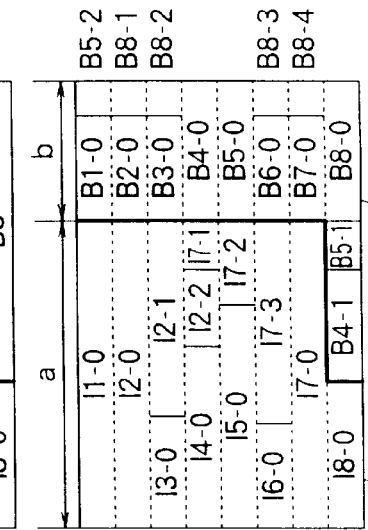
Figure 8E:
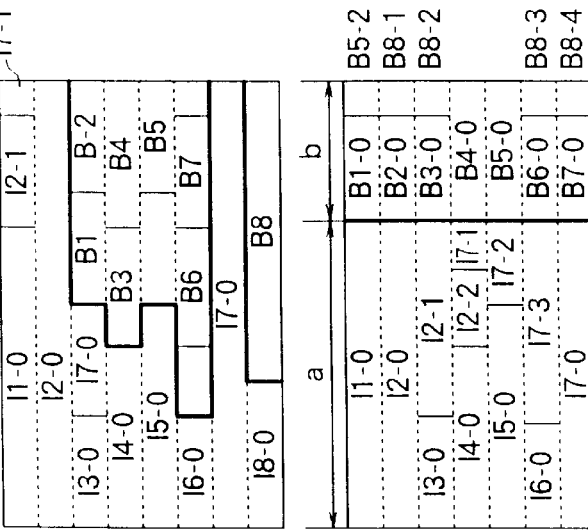

As shown in FIG. 8E, in this other embodiment, the packing circuit 14 uses the recording frame shown in FIG. 5B in above one embodiment divided into a region for the I-frame and a region for the B-frame and packs the I-frame data and the B-frame data in these regions by the same method as that of the first embodiment.

Below, an explanation will be made of the operation of the packing circuit 14 in the other embodiment.

Figure 8A:
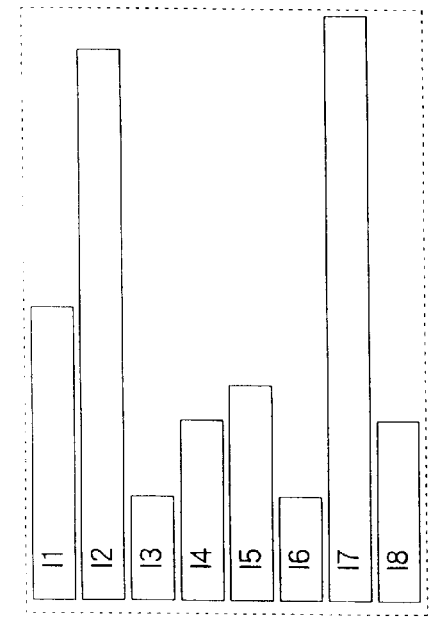

First, the packing circuit 14 arranges, out of the I-frame data shown in FIG. 8A, the data having a data length not more than the data length a of the I-frame region shown in FIG. 8E (I1, I3 to I6, and I8 shown in FIG. 8A) and portions from the head portions to the data length a of the data having a data length of more than the data length a (I2 and I7 shown in FIG. 8A) from the head portions of the I-frame regions of the respectively corresponding synchronization blocks (I1-0 to I8-0: processing 1 shown in FIG. 8E).

Further, the packing circuit 14 performs the processing corresponding to the processing 1 for the B-frame data.

Figure 8B:
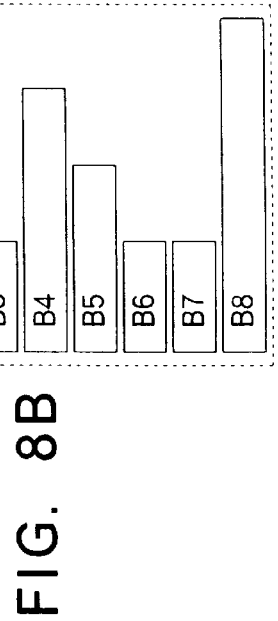

First, the packing circuit 14 arranges, out of the B-frame data shown in FIG. 8B, the data having a data length of not more than the data length b of the B-frame region shown in FIG. 8E (B1 to B3, B6, and B7 shown in FIG. 8B) and the portions from the head portions to the data length b of the data having a data length of more than the data length b (B4, B5, and B8 shown in FIG. 8B) from the head portions of the B-frame regions of the respectively corresponding synchronization blocks (B1-0 to B7-0: processing 1' shown in FIG. 8E).

Next, the packing circuit 14 sequentially arranges the portions after the data length a of the I-frame data having a data length of more than the data length a (I2 and I7 shown in FIG. 8A) (overflow data) from the head portions of the empty regions of the I-frame regions after the end of the processing 1 (I2-1, I2-2, and I7-1 to I7-3 shown in FIG. 8E: processing 2).

Next, the packing circuit 14 sequentially arranges the portions after the data length b of the B-frame data having a data length of more than the data length b (B4 and B5 shown in FIG. 8B) (overflow data) from the head portions of the empty regions of the I-frame regions and the B-frame regions after the end of the processing 1' (B4-1, B5-1, B5-2, and B8-1 to B8-4 shown in FIG. 8E: processing 2').

The operation of the packing circuit 14 mentioned above can be realized by performing the processing of the packing circuit 14 in the first embodiment for only the I-frame data in the I-frame regions and by repeatedly performing the same for only the B-frame data in the B-frame regions.

The video data arranged in the I-frame regions and the B-frame regions as shown in FIG. 8E are stored on the video tape 40.

Below, the operation of the depacking circuit 30 will be explained.

The video data reproduced from the video tape 40 are arranged in the recording frame shown in FIG. 8E and input to the depacking circuit 30.

The depacking circuit 30 takes the I-frame data having a data length of not more than the data length a and the portions from the head portions to the data length a of the I-frame data having a data length of more than the data length a out from the I-frame regions of the synchronization frames shown in FIG. 8E.

Further, the depacking circuit 30 adds the respectively corresponding overflow data to these I-frame data to reproduce the original I-frame data shown in FIG. 8A.

The depacking circuit 30 reproduces the B-frame data by performing the same processing as that for the I-frame regions on the B-frame regions.

That is, the depacking circuit 30 takes the B-frame data having a data length of not more than the data length b and the portions from the head portions to the data length b of the B-frame data having a data length of more than the data length b out from the B-frame regions of the synchronization frames shown in FIG. 8E.

Further, the depacking circuit 30 adds the respectively corresponding overflow data to these B-frame data to reproduce the original B-frame data shown in FIG. 8B.

By changing the processing of the depacking circuit 30 as described above, the original I-frame data and B-frame data can be reproduced from the video data arranged in the recording frame as shown in FIG. 8E.

The operation of the depacking circuit 30 mentioned above can be realized by performing the processing of the depacking circuit 30 in the first embodiment only for the I-frame data in the I-frame regions and repeatedly performing this processing for only the B-frame data in the B-frame regions and in the remaining portions of the I-frame regions after the I-frame data is taken out.

When a data error occurs in the transmission frame, where the conventional method of simply arranging the I-frame data and the B-frame data shown in FIG. 8C from the head portion of the recording frame is used, all of the data after the position at which the data error occurs become unreproducible. Further, it is possible to save only a predetermined portion of the I-frame data when the method of arranging the I-frame data and the B-frame data by the method explained in the embodiment shown in FIG. 8D is used.

Compared with the case where these methods are used, when the I-frame data and the B-frame data are arranged by the method shown in the other embodiment, by reading the data from a predetermined position of the synchronization blocks, the predetermined portion of the I-frame data and the DC component and the low frequency component of the B-frame data can be saved.

Accordingly, when the I-frame data and B-frame data are arranged by the method shown in the other embodiment, in addition to the fact that a similar effect to that by the method shown in the first embodiment is obtained, when a data error occurs in the recording frame, the quality of the video after reproduction becomes further higher than the case where the video data is recorded by the method shown in the first embodiment.

Note that the data length a of the I-frame region and the data length b of the B-frame region in the recording frame can be found from the ratio of the mean amount of data when for example the usual image data are compressed and encoded to I-frame data and B-frame data. Where the data lengths a and b are found from the mean amount of data, there sometimes arises a case where the actual I-frame data and B-frame data of each of the groups of pictures GOP cannot be accommodated in the I-frame region and the B-frame region, respectively. As shown in FIG. 8E, however, since the remainder of the B-frame data can be arranged by using a relatively large I-frame region and by using the remaining region of the I-frame region, no problem arises.

Further, the data lengths a and b do not always have to be fixed lengths and can be determined for every group of pictures by calculating the ratio of the amount of data of the I-frame data and the B-frame data for every group of pictures GOP and based on the ratio of this amount of data.

Next, an explanation will be made of still another embodiment of the present invention.

This still other embodiment corresponds to a case where the group of pictures GOP is comprised by a further larger number of I-frame data, B-frame data, and forward predictive encoded data (P-frame data) and improves the operation of the packing circuit 14 and the depacking circuit 30 shown in the other embodiment.

Below, an explanation will be made of the operation of the packing circuit 14 of this still other embodiment.

FIG. 9A to FIG. 9C are views explaining the operation of the packing circuit 14 shown in FIG. 1 and FIG. 2 in the still other embodiment. Note that, in FIG. 9A to FIG. 9C, for simplification of the illustration and explanation, a case where there are five synchronization blocks is shown.

As shown in FIG. 9A and FIG. 9B, in this still other embodiment, the group of pictures GOP is comprised by five types of data of the I-frame data, three B-frame data (B, B', B"), and the P-frame data. These five types of data are arranged in five regions obtained by dividing the recording frame as shown in FIG. 9C by the method shown in the other embodiment.

First, the packing circuit 14 arranges, out of the I-frame data shown in FIG. 9A, the data having a data length not more than the data length a of the I-frame region shown in FIG. 9C (I2, I3, and I5 shown in FIG. 9A) and the portions from the head portion to the data length a of the data having a data length of more than the data lengthy a (I1 and I4 shown in FIG. 9A) from the head portions of the I-frame regions of the corresponding synchronization blocks (I1-0 to I5-0 shown in FIG. 9E).

Next, the packing circuit 14 arranges, out of the B-frame data (B', B, B") and P-frame data shown in FIG. 9B, the data having a data length not more than the data lengths b', b, b" of the B-frame region and the data length p of the P-frame region shown in FIG. 9C (B'1, B'3 to B'5, B2 to B4, B"1, B"3 to B"5, P1, P3, and P5 shown in FIG. 9B) and the portions from the head portions to the data lengths b', b, b", and p of the data having a data length of more than the data lengths b', b, b", and p (B'2, B1, B5, B"2, P2, and P4 shown in FIG. 9B) from the head portions of the three B-frame regions and P-frame region of the corresponding synchronization blocks (B'1-0 to P5-0 shown in FIG. 9C).

Next, the packing circuit 14 arranges the overflow data of the I-frame data, three types of B-frame data, and the P-frame data shown in FIG. 9A and FIG. 9B (I1-1 to I1-5, I4-1 to I4-5, b'2-1, B1-1, B1-2, B5-1, B"2-1, P2-1, and P4-1) in order from the head portions of the empty regions of the I-frame region, three B-frame regions, and P-frame region as shown in FIG. 9C

The processing by the packing circuit 14 mentioned above can be realized by performing the processing of the packing circuit 14 in the first embodiment for the I-frame data, three types of B-frame data, and the P-frame data in the I-frame region, three B-frame regions, and P-frame region and performing this processing for the overflow data of these five data in the empty regions of these five regions.

As shown in FIG. 9C, the video data arranged in the I-frame region, three B-frame regions, and P-frame region are stored on the video tape 40.

Below, the operation of the depacking circuit 30 will be explained.

The video data reproduced from the video tape 40 are arranged in the recording frame shown in FIG. 9C and input to the depacking circuit 30.

The depacking circuit 30 takes the I-frame data having a data length of not more than the data length a, the portions from the head portions to the data length a of the I-frame data having a data length of more than the data length a, the B-frame data having a data length of not more than the data lengths b', b, and b", the portions from the head portions to the data lengths b', b, and b" of the I-frame data having a data length of more than the data lengths b', b, and b" lengths, the P-frame data having a data length of not more than the data length p, and the portions from the head portions to the data length p of the P-frame data having a data length of more than the data length p from each of the I-frame region, three B-frame regions, and P-frame region of the synchronization frames shown in FIG. 9C.

Further, the depacking circuit 30 adds the corresponding overflow data to these I-frame data, three B-frame data, and P-frame data to reproduce the original I-frame data, three types of B-frame data, and P-frame data shown in FIG. 9A and FIG. 9B.

The operation of the depacking circuit 30 mentioned above can be realized by repeatedly performing the processing of the depacking circuit 30 of the first embodiment for the I-frame data, three types of B-frame data, and P-frame data in each of the I-frame region, three B-frame regions, and P-frame region and performing this processing for the overflow data of each of the I-frame data, three types of B-frame data, and the P-frame data in the remaining portions of the recording frame after these data are taken out.

Further, when the I-frame data, three types of B-frame data, and P-frame data are arranged by the method shown in the still other embodiment, since the head portions are already known, by reading the data from the already known positions, even in a case where a data error occurs in the recording frame, the DC component and low frequency component of each of the I-frame data, three types of B-frame data, and P-frame data can be saved.

In this way, according to the method shown in the still other embodiment, the method shown in the other embodiment can be applied also to a case where the group of pictures GOP is comprised by two or more types of data.

Accordingly, even if the video data is comprised by three or more types of data, when a data error occurs in the transmission frame containing the video data, the quality of the video after reproduction can be made higher than that of the case where the video data is recorded by the method shown in the first embodiment.

Note that, similar modifications as those by the method shown in the other embodiment are possible also for the method shown in the still other embodiment.

As explained above, even if a data error occurs in the middle of the video data after the compression and encoding, much of the low frequency component of the video data after the compression and encoding can be saved.

Further, when a data error occurs in the middle of the video data after the compression and encoding, the intra-frame data having a higher importance for the reproduction of the video can be saved with a higher priority than the inter-frame data.

Further, even if a data error occurs in the video data after the compression and encoding, a higher quality reproduced video can be obtained.

Further, even if variable speed reproduction such as so-called jog shuttling reproduction is carried out, a high quality reproduced video can be obtained.

What is claimed is:

1. Apparatus for recording video data on a recording medium in which frames of said video data are subjected to either intra-frame compression and encoding or inter-frame compression and encoding and arranged into recording frames each having a plurality of recording units of a predetermined capacity, comprising:

means for dividing each frame of said video data into a plurality of blocks each containing a predetermined number of pixel data;

means for intra-frame compressing and encoding at least one frame of said video data on a block basis such that said at least one frame is encoded independent of adjoining frames of said video data so as to generate intra-frame encoded data for each of the plurality of blocks of said at least one frame;

means for inter-frame compressing and encoding other frames of said video data on a block basis such that said other frames are encoded in correlation with adjoining frames of said video data so as to generate inter-frame encoded data for each of the plurality of blocks of each of said other frames;

means for generating recording frames by arranging each of said intra-frame encoded data in a respective recording unit of said recording frames without exceeding said predetermined capacity of said recording unit for each of said intra-frame encoded data and arranging overflow data portions of each of said intra-frame encoded data exceeding said predetermined capacity of said recording unit together with each of said inter-frame encoded data in empty regions of said recording units of said recording frames, wherein each of said intra-frame encoded data and said overflow portions of each of said intra-frame encoded data are positioned within said recording frame at a position so as to be read prior to each of said inter-frame encoded data when said video data is reproduced from said recording medium; and means for recording intra-frame encoded data and said inter-frame encoded data arranged in said recording frames on said recording medium.

2. The apparatus as set forth in claim 1, wherein said means for intra-frame compressing and encoding operates in units of two frames of the video data and compresses and encodes one of two frames of the video data; and said means for inter-frame compressing and encoding operates in units of two frames of the video data and compresses and encodes a remaining frame of the video data.

3. A method of recording video data on a recording medium in which frames of said video data are subjected to either intra-frame compression and encoding or inter-frame compression and encoding and arranged into recording frames each having a plurality of recording units of a predetermined capacity, comprising the steps of:

dividing each frame of said video data into a plurality of blocks each containing a predetermined number of pixel data;

intra-frame compressing and encoding at least one frame of said video data on a block basis such that said at least one frame is encoded independent of adjoining frames of said video data so as to generate intra-frame encoded data for each of the plurality of blocks of said at least one frame;

inter-frame compressing and encoding other frames of said video data on a block basis such that said other frames are encoded in correlation with adjoining frames of said video data so as to generate inter-frame encoded data for each of the plurality of blocks of each of said other frames;

generating recording frames by arranging each of said intra-frame encoded data in a respective recording unit of said recording frames without exceeding said predetermined capacity of said recording unit for each of said intra-frame encoded data and arranging overflow data portions of each of said intra-frame encoded data exceeding said predetermined capacity of said recording unit together with each of said inter-frame encoded data in empty regions of said recording units of said recording frames wherein each of said intra-frame encoded data and said overflow portions of each of said intra-frame encoded data are positioned within said recording frame at a position so as to be read prior to each of said inter-frame encoded data when said video data is reproduced from said recording medium; and recording intra-frame encoded data and said inter-frame encoded data arranged in said recording frames on said recording medium.

4. Apparatus for reproducing video data from a recording medium in which said video data was recorded as recording frames having a plurality of recording units of a predetermined capacity; each frame of said video data being divided into a plurality of blocks and each block being subjected to either intra-frame compression and encoding to generate intra-frame encoded data or inter-frame compression and encoding to generate inter-frame encoded data; each of said intra-frame encoded data being recorded in a respective recording unit without exceeding the capacity of said recording unit with overflow data portions of each of said intra-frame data that exceed said predetermined capacity of said recording unit together with each of said inter-frame encoded data being recorded in empty regions of said recording units of said recording frames wherein each of said intra-frame encoded data and said overflow portions of each of said intra-frame encoded data are positioned within said recording frame at a position so as to be read prior to each of said inter-frame encoded data when said video data is reproduced from said recording medium, said apparatus comprising:

means for reproducing said intra-frame encoded data and said inter-frame encoded data of said recording frames from said recording medium;

means for extracting each of said intra-frame encoded data from said recording units of said recording frames;

means for extracting said overflow data portion of said intra-frame encoded data exceeding said predetermined capacity of said recording unit and each of said inter-frame encoded data from remaining regions of said recording units of said recording frames;

means for combining each of said overflow data portions with a corresponding intra-frame encoded data; and means for outputting said intra-frame encoded data and said inter-frame encoded data as said video data.

5. A method of reproducing video data from a recording medium in which said video data was recorded as recording frames having a plurality of recording units of a predetermined capacity; each frame of said video data being divided into a plurality of blocks and each block being subjected to either intra-frame compression and encoding to generate intra-frame encoded data or inter-frame compression and encoding to generate inter-frame encoded data; each of said intra-frame encoded data being recorded in a respective recording unit without exceeding the capacity of said recording unit with overflow data portions of each of said intra-frame data that exceed said predetermined capacity of said recording unit together with each of said inter-frame encoded data being recorded in empty regions of said recording units of said recording frames wherein each of said intra-frame encoded data and said overflow portions of each of said intra-frame encoded data are positioned within said recording frame at a position so as to be read prior to each of said inter-frame encoded data when said video data is reproduced from said recording medium, said method comprising the steps of:

reproducing said intra-frame encoded data and said inter-frame encoded data of said recording frames from said recording medium;

extracting each of said intra-frame encoded data from said recording units of said recording frames;

extracting said overflow data portion of said intra-frame encoded data exceeding said predetermined capacity of said recording unit from additional regions of said recording units of said recording frames;

extracting each of said inter-frame encoded data from remaining additional regions of said recording units of said recording frames after said intra-frame encoded data and said overflow data portion of said intra-frame encoded data has been extracted;

combining each of said overflow data portions with a corresponding intra-frame encoded data; and outputting said intra-frame encoded data and said inter-frame encoded data as said video data.

6. Apparatus for recording video data on a recording medium in which frames of said video data are subjected to either intra-frame compression and encoding or inter-frame compression and encoding and arranged into recording frames each having a plurality of recording units of a predetermined capacity, comprising:

means for dividing said plurality of recording units into first and second areas;

means for dividing each frame of said video data into a plurality of blocks each containing a predetermined number of pixel data;

means for intra-frame compressing and encoding at least one frame of said video data on a block basis such that said at least one frame is encoded independent of adjoining frames of said video data so as to generate intra-frame encoded data for each of the plurality of blocks of said at least one frame;

means for inter-frame compressing and encoding other frames of said video data on a block basis such that said other frames are encoded in correlation with adjoining frames of said video data so as to generate inter-frame encoded data for each of the plurality of blocks of each of said other frames;

means for generating recording frames by arranging each of said intra-frame encoded data in a respective recording unit of said first area without exceeding said predetermined capacity of said recording unit for each of said intra-frame encoded data, arranging overflow data portions of each of said intra-frame encoded data exceeding said predetermined capacity of said recording unit in empty regions of recording units of said first area, arranging each of said inter-frame encoded data in a respective recording unit of said second area without exceeding said predetermined capacity of said recording unit for each of said inter-frame encoded data, and arranging overflow data portions of each of said inter-frame encoded data exceeding said predetermined capacity of said recording unit in empty regions of recording units of said second area wherein each of said intra-frame encoded data and said overflow portions of each of said intra-frame encoded data recorded in said first area are positioned so as to be read prior to each of said inter-frame encoded data and said overflow portions of each of said inter-frame encoded data recorded in said second area when said video data is reproduced from said recording medium; and means for recording intra-frame encoded data and said inter-frame encoded data arranged in said recording frames on said recording medium.

7. The apparatus as set forth in claim 6, wherein said means for intra-frame compressing and encoding operates in units of two frames of the video data and compresses and encodes one of two frames of the video data; and said means for inter-frame compressing and encoding operates in units of two frames of the video data and compresses and encodes a remaining frame of the video data.

8. Apparatus for recording video data on a recording medium in which frames of said video data are subjected to either intra-frame compression and encoding or inter-frame compression and encoding and arranged into recording frames each having a plurality of recording units of a predetermined capacity, comprising:

means for dividing said plurality of recording units into first and second areas;

means for dividing each frame of said video data into a plurality of blocks each containing a predetermined number of pixel data;

means for intra-frame compressing and encoding at least one frame of said video data on a block basis such that said at least one frame is encoded independent of adjoining frames of said video data so as to generate intra-frame encoded data for each of the plurality of blocks of said at least one frame;

means for inter-frame compressing and encoding other frames of said video data on a block basis such that said other frames are encoded in correlation with adjoining frames of said video data so as to generate inter-frame encoded data for each of the plurality of blocks of each of said other frames;

means for generating recording frames by arranging each of said intra-frame encoded data in a respective recording unit of said first area without exceeding said predetermined capacity of said recording unit for each of said intra-frame encoded data, arranging overflow data portions of each of said intra-frame encoded data exceeding said predetermined capacity of said recording unit in empty regions of recording units of said first area, arranging each of said inter-frame encoded data in a respective recording unit of said second area without exceeding said predetermined capacity of said recording unit for each of said inter-frame encoded data, and arranging overflow data portions of each of said inter-frame encoded data exceeding said predetermined capacity of said recording unit in empty regions of recording units of said first area or said second area wherein each of said intra-frame encoded data and said overflow portions of each of said intra-frame encoded data recorded in said first area are positioned so as to be read prior to each of said inter-frame encoded data recorded in said second area and said overflow portions of each of said inter-frame encoded data recorded in said first or second area when said video data is reproduced from said recording medium; and means for recording intra-frame encoded data and said inter-frame encoded data arranged in said recording frames on said recording medium.

9. A method of recording video data on a recording medium in which frames of said video data are subjected to either intra-frame compression and encoding or inter-frame compression and encoding and arranged into recording frames each having a plurality of recording units of a predetermined capacity, comprising:

dividing said plurality of recording units into first and second areas;

dividing each frame of said video data into a plurality of blocks each containing a predetermined number of pixel data;

intra-frame compressing and encoding at least one frame of said video data on a block basis such that said at least one frame is encoded independent of adjoining frames of said video data so as to generate intra-frame encoded data for each of the plurality of blocks of said at least one frame;

inter-frame compressing and encoding other frames of said video data on a block basis such that said other frames are encoded in correlation with adjoining frames of said video data so as to generate inter-frame encoded data for each of the plurality of blocks of each of said other frames;

generating recording frames by arranging each of said intra-frame encoded data in a respective recording unit of said first area without exceeding said predetermined capacity of said recording unit for each of said intra-frame encoded data, arranging overflow data portions of each of said intra-frame encoded data exceeding said predetermined capacity of said recording unit in empty regions of recording units of said first area, arranging each of said inter-frame encoded data in a respective recording unit of said second area without exceeding said predetermined capacity of said recording unit for each of said inter-frame encoded data, and arranging overflow data portions of each of said inter-frame encoded data exceeding said predetermined capacity of said recording unit in empty regions of recording units of said second area wherein each of said intra-frame encoded data and said overflow portions of each of said intra-frame encoded data recorded in said first area are positioned so as to be read prior to each of said inter-frame encoded data and said overflow portions of each of said inter-frame frame encoded data recorded in said second area when said video data is reproduced from said recording medium; and recording intra-frame encoded data and said inter-frame encoded data arranged in said recording frames on said recording medium.

10. Apparatus for reproducing video data from a recording medium in which said video data was recorded as recording frames having a plurality of recording units of a predetermined capacity, said plurality of recording units having first and second areas; each frame of said video data being divided into a plurality of blocks and each block being subjected to either intra-frame compression and encoding to generate intra-frame encoded data or inter-frame compression and encoding to generate inter-frame encoded data; each of said intra-frame encoded data being recorded in a respective recording unit of said first area without exceeding the capacity of said recording unit with overflow data portions of each of said intra-frame data that exceed said predetermined capacity of said recording unit being recorded in empty regions of said recording units of said first area; and each of said inter-frame encoded data being recorded in a respective recording unit of said second area without exceeding the capacity of said recording unit with overflow data portions of each of said inter-frame data that exceed said predetermined capacity of said recording unit being recorded in empty regions of said recording units of said second area wherein each of said intra-frame encoded data and said overflow portions of each of said intra-frame encoded data recorded in said first area are positioned so as to be read prior to each of said inter-frame encoded data and said overflow portions of each of said inter-frame encoded data recorded in said second area when said video data is reproduced from said recording medium, comprising:

means for reproducing said intra-frame encoded data and said inter-frame encoded data of said recording frames from said recording medium;

means for extracting each of said intra-frame encoded data from said recording units of said first area;

means for extracting said overflow data portion of said intra-frame encoded data exceeding said predetermined capacity of said recording unit from remaining regions of said recording units of said first area;

means for extracting each of said inter-frame encoded data from said recording units of said second area;

means for extracting said overflow data portion of said inter-frame encoded data exceeding said predetermined capacity of said recording unit from remaining regions of said recording units of said second area;

means for combining each of said overflow data portions of said intra-frame encoded data with a corresponding intra-frame encoded data;

means for combining each of said overflow data portions of said inter-frame encoded data with a corresponding inter-frame encoded data; and means for outputting said intra-frame encoded data and said inter-frame encoded data as said video data.

11. A method of reproducing video data from a recording medium in which said video data was recorded as recording frames having a plurality of recording units of a predetermined capacity, said plurality of recording units having first and second areas; each frame of said video data being divided into a plurality of blocks and each block being subjected to either intra-frame compression and encoding to generate intra-frame encoded data or inter-frame compression and encoding to generate inter-frame encoded data; each of said intra-frame encoded data being recorded in a respective recording unit of said first area without exceeding the capacity of said recording unit with overflow data portions of each of said intra-frame data that exceed said predetermined capacity of said recording unit being recorded in empty regions of said recording units of said first area; and each of said inter-frame encoded data being recorded in a respective recording unit of said second area without exceeding the capacity of said recording unit with overflow data portions of each of said inter-frame data that exceed said predetermined capacity of said recording unit being recorded in empty regions of said recording units of said second area wherein each of said intra-frame encoded data and said overflow portions of each of said intra-frame encoded data recorded in said first area are positioned so as to be read prior to each of said inter-frame encoded data and said overflow portions of each of said inter-frame encoded data recorded in said second area when said video data is reproduced from said recording medium, comprising the steps of:

reproducing said intra-frame encoded data and said inter-frame encoded data of said recording frames from said recording medium;

extracting each of said intra-frame encoded data from said recording units of said first area;

extracting said overflow data portion of said intra-frame encoded data exceeding said predetermined capacity of said recording unit from remaining regions of said recording units of said first area;

extracting each of said inter-frame encoded data from said recording units of said second area;

extracting said overflow data portion of said inter-frame encoded data exceeding said predetermined capacity of said recording unit from remaining regions of said recording units of said second area;

combining each of said overflow data portions of said intra-frame encoded data with a corresponding intra-frame encoded data;

combining each of said overflow data portions of said inter-frame encoded data with a corresponding inter-frame encoded data; and outputting said intra-frame encoded data and said inter-frame encoded data as said video data.

* * * * *